(12) United States Patent
Rossodivita

(10) Patent No.: US 11,697,282 B2
(45) Date of Patent: Jul. 11, 2023

(54) METHOD FOR THE PRODUCTION OF CURVED FURNITURE COMPONENTS AND COMPONENT THUS OBTAINABLE

(71) Applicant: TECNOFORM S.P.A., Valsamoggia (IT)

(72) Inventor: Alessandro Rossodivita, Valsamoggia (IT)

(73) Assignee: Technoform S.p.a., Valsamoggia (IT)

( * ) Notice: Subject to any disclaimer, the term of this patent is extended or adjusted under 35 U.S.C. 154(b) by 0 days.

(21) Appl. No.: 16/641,201

(22) PCT Filed: Aug. 2, 2018

(86) PCT No.: PCT/IB2018/055819
§ 371 (c)(1),
(2) Date: Feb. 21, 2020

(87) PCT Pub. No.: WO2019/038613
PCT Pub. Date: Feb. 28, 2019

(65) Prior Publication Data
US 2020/0223207 A1 Jul. 16, 2020

(30) Foreign Application Priority Data

Aug. 21, 2017 (IT) ..................... 102017000094824

(51) Int. Cl.
*B32B 37/02* (2006.01)
*B32B 37/12* (2006.01)
(Continued)

(52) U.S. Cl.
CPC ........ *B32B 38/1866* (2013.01); *A47B 96/206* (2013.01); *B27D 1/083* (2013.01);
(Continued)

(58) Field of Classification Search
CPC .... B32B 2037/1261; B32B 2037/1215; B32B 2038/0056
See application file for complete search history.

(56) References Cited

U.S. PATENT DOCUMENTS

| 4,199,389 A | 4/1980 | Palfey et al. |
| 2002/0092605 A1 | 7/2002 | Scarimboio |

(Continued)

FOREIGN PATENT DOCUMENTS

| DE | 2357051 | 5/1975 |
| DE | 19800969 | 7/1999 |

(Continued)

*Primary Examiner* — Scott W Dodds
(74) *Attorney, Agent, or Firm* — David B. Tingey; Bryant J. Keller; Kirton McConkie

(57) ABSTRACT

The method for the production of curved furniture components comprises:
  an overlapping step of a first panel of wooden, plastic or metal material, of at least one intermediate separating layer and of a second panel of wooden, plastic or metal material for obtaining a flat semi-finished product having a perimeter edge;
  an interposition step of a polyurethane type adhesive between the intermediate layer and the first panel and second panel by hot dispensing of said adhesive on the surfaces of the first and the second panels which are adapted to be associated with the intermediate layer or by hot dispensing of the adhesive on the surfaces of the intermediate layer which are adapted to be associated with said first panel and second panel;
  a cold shaping step of the semi-finished product for obtaining a curved component; and
  a spraying step of a water-based auxiliary substance between the intermediate layer and at least one of the first panel and the second panel, subsequent to the interposition of the adhesive.

9 Claims, 4 Drawing Sheets

(51) Int. Cl.
*B32B 38/18* (2006.01)
*A47B 96/20* (2006.01)
*B27D 1/08* (2006.01)
*B32B 7/12* (2006.01)
*B32B 37/10* (2006.01)
*B32B 37/00* (2006.01)
*B32B 37/08* (2006.01)
*B32B 3/12* (2006.01)
*B32B 38/00* (2006.01)
*B32B 37/24* (2006.01)

(52) U.S. Cl.
CPC .............. *B32B 3/12* (2013.01); *B32B 7/12* (2013.01); *B32B 37/0038* (2013.01); *B32B 37/08* (2013.01); *B32B 37/10* (2013.01); *B32B 37/12* (2013.01); *B32B 2037/1215* (2013.01); *B32B 2037/1261* (2013.01); *B32B 2037/243* (2013.01); *B32B 2038/0056* (2013.01); *B32B 2038/0076* (2013.01); *B32B 2305/02* (2013.01); *B32B 2375/00* (2013.01); *B32B 2479/00* (2013.01)

(56) References Cited

U.S. PATENT DOCUMENTS

2004/0010095 A1* 1/2004 Kesselmayer ....... C08G 18/307
 525/453
2004/0170856 A1* 9/2004 Arndell ................. B27M 3/006
 156/331.4

FOREIGN PATENT DOCUMENTS

| EP | 1279471 | 1/2003 |
| EP | 1123672 | 6/2003 |
| EP | 1336471 | 8/2003 |
| WO | 2007069065 | 6/2007 |

* cited by examiner

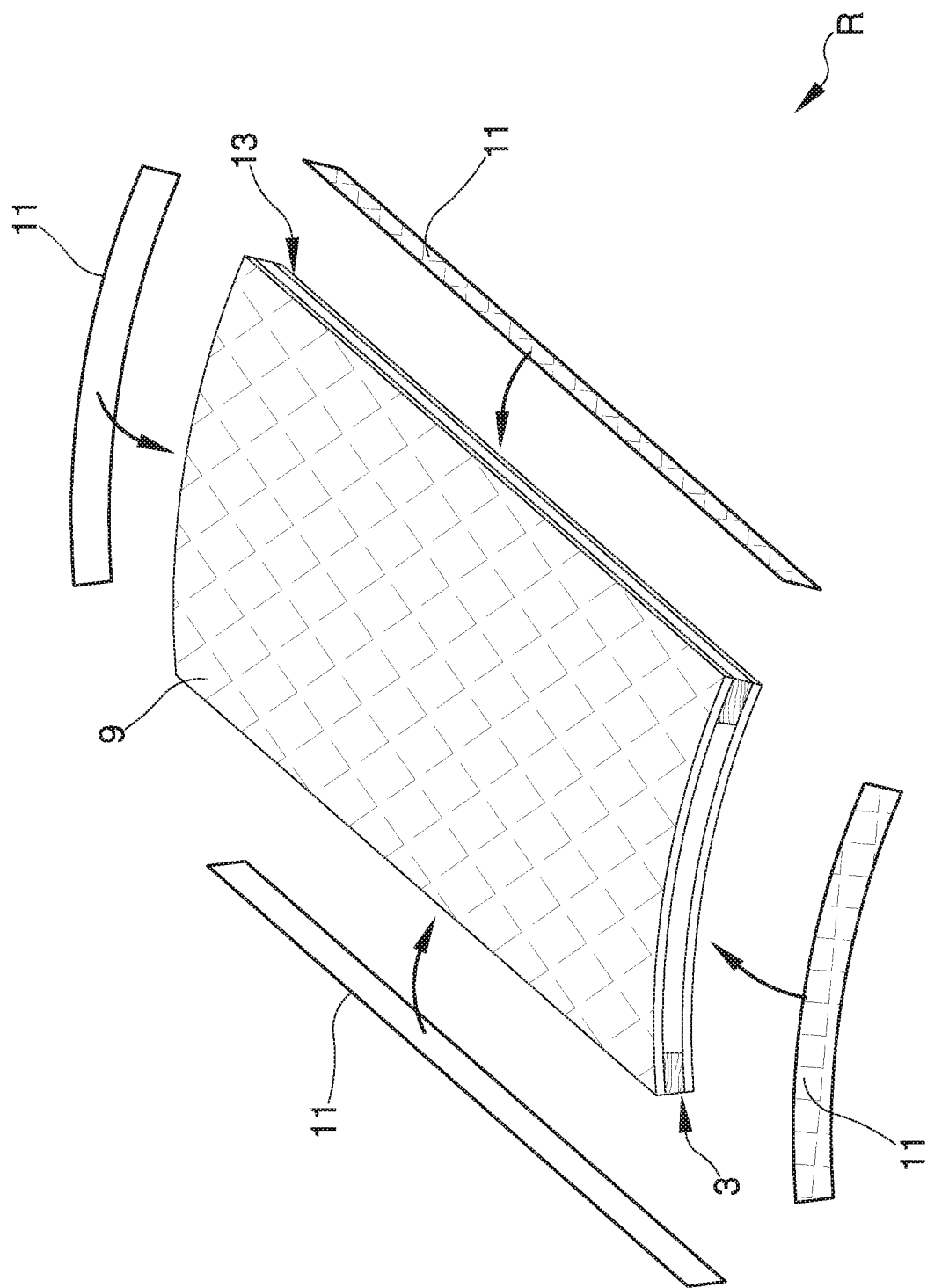

METHOD FOR THE PRODUCTION OF CURVED FURNITURE COMPONENTS AND COMPONENT THUS OBTAINABLE

TECHNICAL FIELD

The present invention relates to a method for the production of curved furniture components, doors for furniture in particular, and the component thus obtainable.

BACKGROUND ART

It is well known that in the furniture industry, e.g., for the production of modern-style furniture, alternative materials to solid wood are used, which make it possible to obtain the most varied decorative effects.

In particular, the use of multi-layer materials is known for the production of curved furniture components, such as doors for furniture, obtained by overlapping a plurality of panels of different materials, joined integrally by the interposition of appropriate adhesives.

Alternatively, known doors are manufactured in hollow-core construction, i.e. by inserting one or more layers of filler material between the outermost panels, thus making it possible to obtain a lighter component without compromising on strength.

A known method for the production of curved doors in hollow-core construction, for example, involves making the stratified component in a flat configuration, obtained by overlapping the various layers on a workbench by means of interposition of thermosetting adhesives, such as ureic adhesives, and the subsequent pressing of the component into a shaped mold so as to give it the desired curvature.

Pressing is currently carried out on presses equipped with heating means that facilitate and accelerate the hardening of the adhesive.

For this purpose, electromagnetic wave generators connected to regulating control units are usually used, which act by energizing and, consequently, by heating the molecules of the adhesive during the pressing step.

Generally, known doors consist of two outer plywood panels which have an applied decorative coating on the exposed faces, between which is interposed a layer of filler material consisting of a pair of strips of wood material arranged at two parallel sides of the outer panels and separated by a sheet of paper material which occupies the inter-space defined between the panels and the strips.

To manufacture these doors, roller coating machines must be used, operating cold, for the application of the adhesive on the upper and lower surfaces of the strips and sheet, and presses complete with appropriate molds and equipped with control units for the regulation of the wave generator.

Document EP 1 123 672 describes a method for the production of curved plates for furnishing which involves gluing a strip of natural wood onto at least one outer edge of multiple chipboard, fiberboard or light wood panels, the gluing of several such prepared panels, the covering of at least one side of the resulting assembled product with a veneer or paper, and the modeling of such assembled product with a press prior to the hardening of the glue.

Document DE 198 00 969 describes a connection panel and a method for its realization. The connecting panel comprises several layers and is curved. At least the outer layers are made of poplar wood to allow the panels to be made by pressing the layers glued together and then by cold pressing for two minutes.

Document U.S. Pat. No. 4,199,389 describes a curved laminated layered panel provided with a plastic foam core and covering surfaces. The panel is made by applying pressure-sensitive adhesives on adjacent faces to be fixed, by interposing a layer between the adjacent surfaces of the sheets to be laminated, positioning the sheets to be laminated inside a corresponding mold, removing the intermediate layers and subjecting the mold to the pressure of rollers to form the sheets and shape them according to the profile of the mold itself.

These known methods are not without their drawbacks, among which the fact that, particularly for the outer panels, materials have to be used that can withstand conventional working conditions without damaging, the cost of which has a considerable impact on the unit cost of the manufactured products thus obtained.

Moreover, since the doors have to remain in the heated presses for time enough to ensure the gluing of the various materials, which means 15 minutes for each piece, the productivity of the dedicated systems is strongly penalized.

Another limitation of the known methods is that the presses used must be equipped with a complex and expensive electronic apparatus for the controlled generation of the waves which facilitate the hardening of the adhesive, the operation of which involves significant energy consumption.

Last but not least, the heating inside the press entails the danger of the formation of voltaic arcs with consequent burning of the molds and of the pieces being worked, which cause economic losses linked to the damage of the materials and of the molds themselves, the maintenance of which is very costly. Finally, the operators working on known doors are permanently exposed to serious health risks due to the presence of magnetic fields induced by heating waves and the high fire load of the work environments.

The drawbacks described above have been partly solved by the European patent EP1336471, which describes a method involving the use of a polyurethane adhesive during the assembly steps of the component to be curved by pressing. Nevertheless, the solution provided for in European patent EP1336471 is also susceptible to improvement.

Polyurethane adhesive, in fact, has a variable spreading capacity depending on different climatic conditions (temperature and humidity).

In particular, at high temperatures spreading takes place very slowly and this leads to delays in the realization of the component which results in a decrease in productivity.

DESCRIPTION OF THE INVENTION

The main aim of the present invention is to provide a method for the production of curved furniture components and component obtained this way which makes it possible to reduce the unit cost of the obtained products, without jeopardizing the quality level.

Another object of the invention is to make the required production operations faster, increasing the productivity and the efficiency of the dedicated plants.

This aim and these objects are all achieved by the present method for the production of curved furniture components which comprises: an overlapping step of a first panel of wood, plastic or metal material, of at least one intermediate separating layer and of a second panel of wood, plastic or metal material, in order to obtain a flat semi-finished product, adhesive being interposed between the intermediate layer and the first and second panels; and a cold shaping step of the semi-finished product to obtain a curved component;

and it is characterized by the fact that it comprises a spraying step of an auxiliary water-based substance between the intermediate layer and at least one of the first panel and the second panel, following the interposition of the adhesive.

The curved furniture component obtainable using the method to which the invention relates is characterized by the fact that it comprises a first panel of wood, plastic or metal material, at least one intermediate separation layer and a second panel of wood, plastic or metal material, overlapped on each other and integrally joined by the interposition of adhesive, the component having a curved contour.

BRIEF DESCRIPTION OF THE DRAWINGS

Other characteristics and advantages of the present invention will become more evident from the detailed description of a preferred, but not exclusive embodiment of a method for the production of curved furniture components, doors for furniture in particular, and the component thus obtainable, illustrated by way of an indicative, but non-limiting example, in the attached drawings in which:

FIG. 4 is a schematic axonometric view of a coating step of the method according to the invention.

EMBODIMENTS OF THE INVENTION

Figure 1:
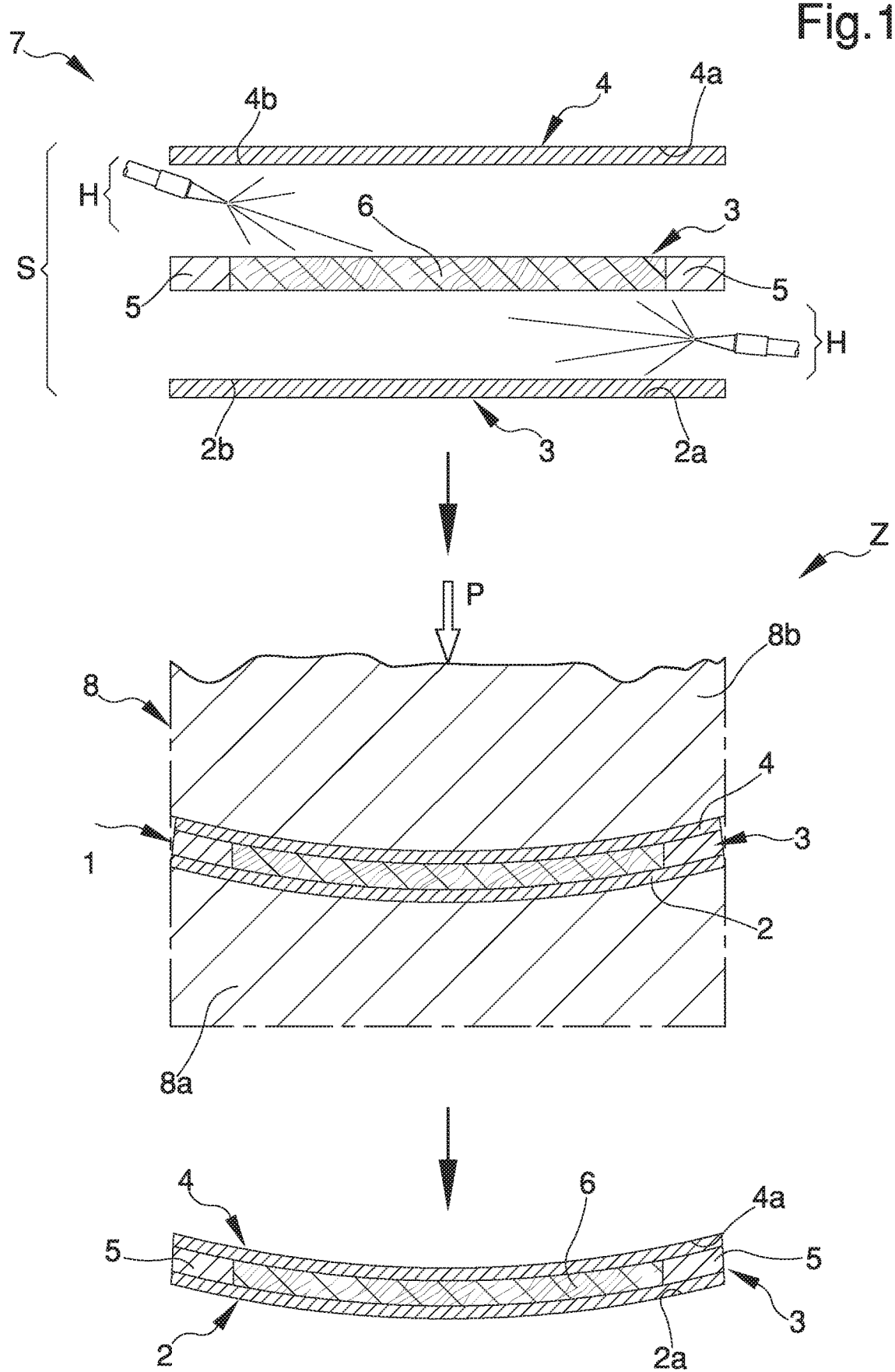
FIG. 1 is a schematic view of the overlapping, shaping and spraying steps of the method according to the invention.

With particular reference to these illustrations, reference numeral 1 globally indicates a curved furniture component obtainable with the method to which the invention relates.

The component 1 comprises a first panel 2 of wooden, plastic or metal material, an intermediate separating layer 3 and a second panel 4 of wooden, plastic or metal material, overlapped on each other and integrally joined by the interposition of adhesive, and has a curved contour.

Usefully, at least one of the first panel 2 and the second panel 4 has the respective exposed surface 2a, 4a integrally joined with a decorative coating 9. Advantageously, the component 1 comprises a perimeter edge 13 at least partly coated with a beading portion 10 obtained from the same decorative coating 9, e.g. a portion of the coating 9 bent and glued to the perimeter edge 13 itself through a post-forming technique.

Alternatively, the component 1 comprises a perimeter edge 13 at least partly coated with a coating edge 11, e.g. coating strips glued on the perimeter edge 13 itself.

The solution cannot be ruled out whereby a part of the perimeter edge 13 is coated with a coating edge 11, e.g., the short sides of a shape having a rectangular perimeter, and in which the other part is coated with a beading portion 10 of the decorative coating 9, e.g., the long sides of the same shape having a rectangular perimeter.

In the particular embodiment shown in the illustrations, the door 1 has a substantially cylindrical shape, but alternative embodiments cannot be ruled out wherein the door 1 has different curvatures.

Advantageously, the wooden material making up the first panel 2 and the second panel 4 is of the type comprising agglomerated wood fibers, i.e. compacted and assembled by the interposition of a binder; alternatively, as mentioned above, the use of plastic or metal material is conceivable.

A material suitable for making the first panel 2 and the second panel 4 is, for example, commercially known as MDF (Medium Density Fibre).

It should be noticed that wood fiber-based materials cost about one third of the price per cubic meter of traditional plywood, but do not offer strength to normal working conditions such as to be able to be used to make curved components using the usual method of heated pressing to facilitate the hardening of the traditional thermosetting adhesive.

Furthermore, the use of these materials together with urea adhesive, by pressing at room temperature, would not be advantageous as the cycle times would be so long that it would be economically counterproductive to replace the plywood. Advantageously, the use of an adhesive of the type reactive to pressure, and of a polyurethane adhesive in particular, combined with the material comprising wood fibers, or plastic or metal, makes cold shaping advantageous since, at room temperature under the action of adequate pressure, such adhesive hardens within a short time—in just a few minutes—and ensures a firm and stable connection between the various materials and the maintenance of the curved contour.

The pressure-reactive adhesives penetrate into the porosity of the contact surfaces that have to be sealed together and, under the action of pressure, develop chemical reactions that facilitate adhesion, thus ensuring a firm and stable bond between the surfaces.

Subsequently, the bonding is completed by the chemical reaction between adhesive and ambient humidity.

The first panel 2, the intermediate layer 3 and the second panel 4 have shapes and extensions of the contact surfaces that coincide and are arranged on top of each other in such a way that their respective perimeters mate with each other. In the particular embodiment shown, these surfaces are quadrangular in shape and have coinciding length and width.

The intermediate layer 3 comprises two strips 5 arranged parallel and between which is positioned a sheet 6 made of material having the same thickness of the strips 5.

The strips 5 are made of plywood or poplar chipboard, MDF or other materials (e.g. plastic or metal), while the material of which the sheet 6 is made is of the honeycomb paper-like type or foam polymer type.

The strips 5 and the sheet 6 are arranged parallel to the generators of the curved contour of the component 1.

The intermediate layer 3 is thicker than the first panel 2 and the second panel 4, so that the component 1 is of a certain overall height, but still light in weight. Decorative coatings, which are not shown in the illustrations, of the type of paper or PVC sheets printed with wood patterns, veneers of wood species or the like are applicable to the exposed surfaces 2a and 4a of the respective panels 2 and 4.

The method for the production of curved furniture components is as follows and comprises:
  an overlapping step S of a first panel 2 of wooden, plastic or metal material, of an intermediate separating layer 3 and of a second panel 4 of wooden, plastic or metal material for obtaining a flat semi-finished product 7 having a perimeter edge 13;
  an interposition step, for simplicity not shown in the illustrations, of a polyurethane type adhesive between the intermediate layer 3 and the first and second panel 2, 4 by hot dispensing of the adhesive on the surfaces of the first and second panels which are adapted to be associated with the intermediate layer 3, or by hot dispensing of the adhesive on the surfaces of the intermediate layer 3 which are adapted to be associated with the first and second panel 2, 4; and a cold shaping step Z of the semi-finished product 7 for obtaining a curved component 1.

According to the invention, the method comprises a spraying step H of a water-based auxiliary substance 12 between the intermediate layer 3 and at least one of the first panel 2 and the second panel 4.

The spraying step H is subsequent to the interposition of the adhesive.

This feature allows regulating the adhesive setting speed and in particular allows speeding up and improving setting when weather conditions involve high temperatures.

The water-based auxiliary substance 12 interacts in fact with the polyurethane adhesive, speeding up its setting.

This way, the semi-finished product 7 can be conveyed to subsequent steps of the process reducing waiting times and, therefore, increasing the productivity of the process.

Advantageously, the water-based auxiliary substance 12 is of the water type, but different substances, such as additivated aqueous mixtures or other water-based substances, cannot be ruled out.

In the present embodiment, an application step is carried out of the decorative coating 9 onto the exposed surfaces 2a and 4a.

A sectioning step is then carried out, not shown in the illustrations, by cutting the first panel 2, the second panel 4, the strips 5 and the sheet 6, so as to bring them to size.

The hot melt distribution step of the adhesive is performed on the installation surface 2b of the first panel 2, intended to be associated with the intermediate layer 3, and then the overlapping step is performed of the intermediate layer 3 onto the first panel 2 so that the respective perimeters coincide, having previously positioned the first panel 2 on a worktop with the exposed surface 2a facing downwards.

The overlapping step S of the intermediate layer 3 on the first panel 2 consists in placing the strips 5 onto the first panel 2 at two of its parallel sides and then placing the sheet 6 between the strips 5.

Subsequently, the hot melt distribution step of the adhesive is performed on the installation surface 4b of the second panel 4, intended to be coupled to the intermediate layer 3, and then the overlapping step S is performed of the second panel 4, which is arranged with the exposed surface 4a facing upwards, on the intermediate layer 3 so that the respective perimeters coincide, thus obtaining a flat semi-finished product 7.

To distribute the adhesive on the installation surfaces 2b and 4b, a hot operating roller spreader machine of the conventional type can be used.

The hot application of the adhesive allows keeping it fluid so as to distribute it evenly on the first panel 2 and on the second panel 4, without damaging them.

Alternatively, a hot distribution step of the adhesive on the opposite surfaces of the intermediate layer 3 could be provided for.

Together with the hot distribution of the adhesive, or immediately after, water 12 is sprayed on the same surfaces on which the polyurethane adhesive has been applied.

The semi-finished product 7 is conveyed in short times to the cold shaping step Z to obtain the curved component 1.

Such step consists in cold pressing carried out by keeping the semi-finished product 7 for a time period of between 1 and 7 minutes under the action of a pressure comprised between 1 and 6 Kg/cm$^2$ at room temperature.

By applying a pressure of 4 Kg/cm$^2$, it is possible, for example, to obtain stably the desired curvature in approx. 3 minutes.

Pressing can be carried out using traditional static presses by placing the semi-finished product 7 in a mold 8 and leaving it closed in the press at room temperature for the preset time under the action of the pressure P.

The semi-finished product 7 is placed inside the mold 8 with the strips 5 and the sheet 6 oriented parallel to the generators of the curved contour to be obtained. The mold 8 is shaped to give the semi-finished product 7 the desired curved contour and is composed of a lower fixed portion 8a, which has a cylindrical and concave shape, and of an upper removable portion 8b, which has a cylindrical and convex shape.

In this case, the sectioning step is carried out to bring the first panel 2, the intermediate layer 3 and the second panel 4 to the size of the mold 8.

Alternatively, pressing can be carried out using profiling rollers of the conventional type, thus obtaining the additional advantage of continuous production, made possible by the rapid setting of the adhesive used.

At the end of the shaping step Z, a resting step is envisaged, i.e. the curved component 1, previously extracted from the mold 8, must wait a few hours before being sent for further machining in order to ensure the complete setting of the adhesive.

Figure 2:
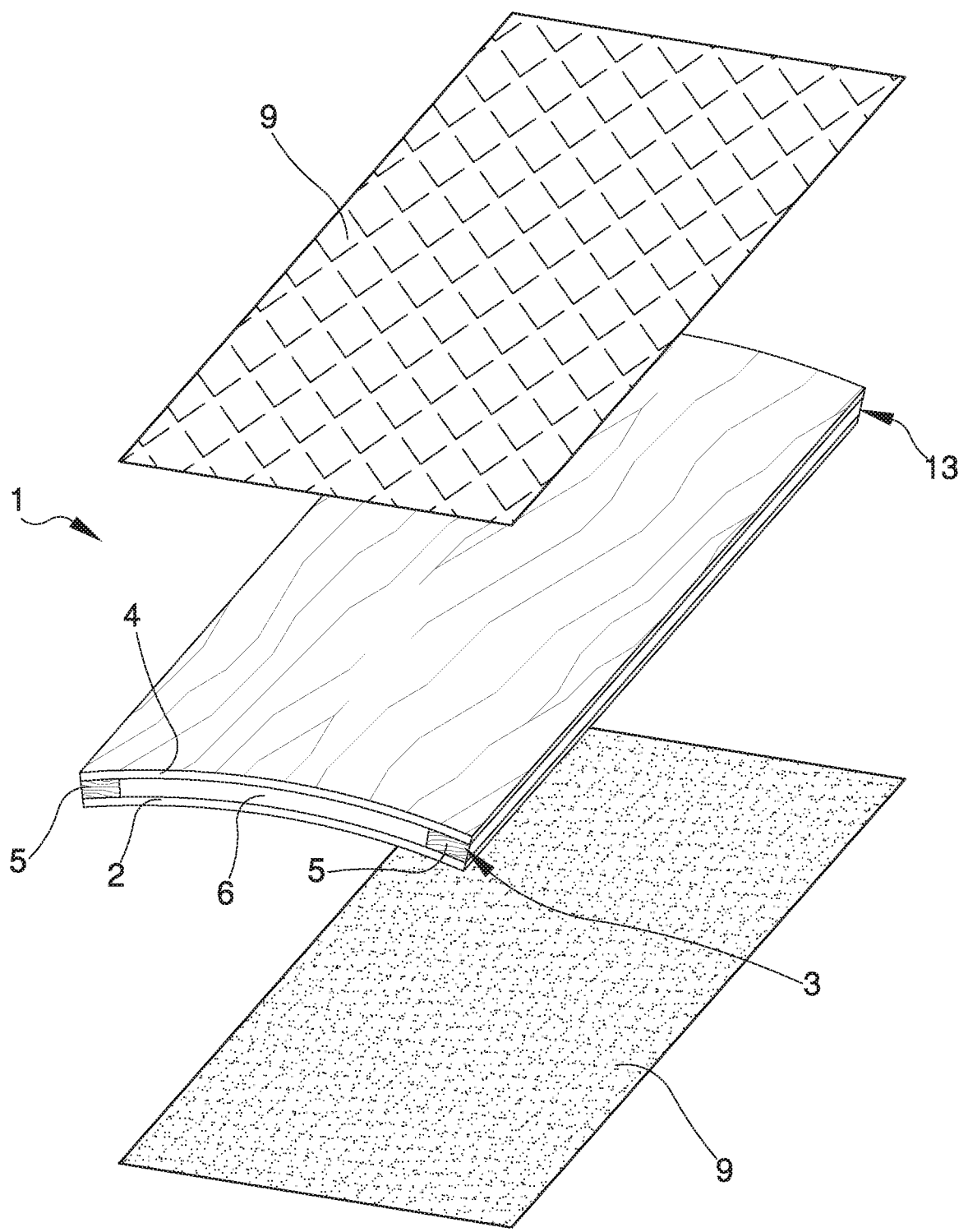
FIG. 2 is an axonometric and partly exploded view of the component according to the invention.
Figure 3:
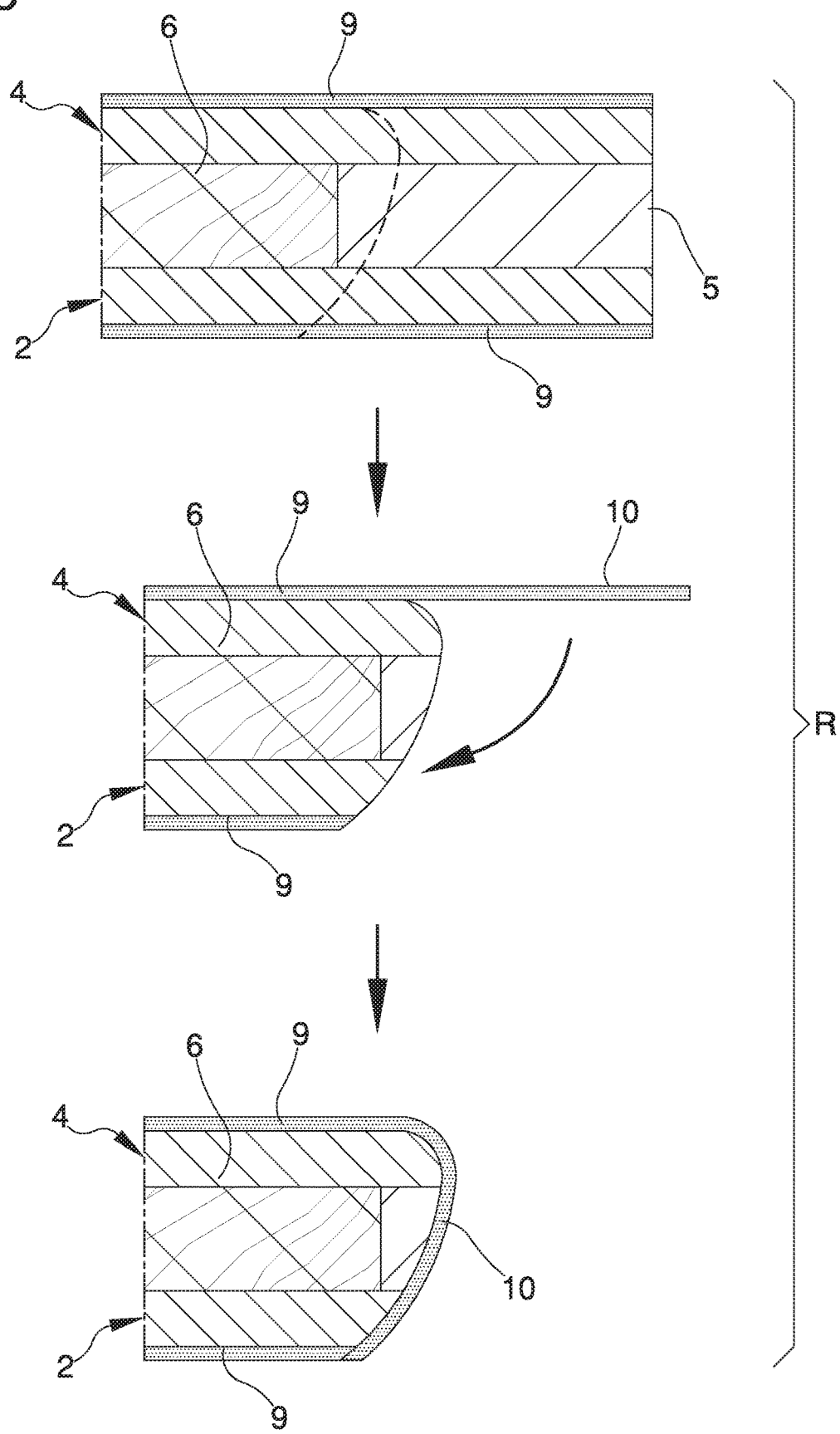
FIG. 3 is a schematic view of a detail of a beading step of the method according to the invention.

As an alternative to the described process, it is possible to envisage the application of the decorative coating 9 onto one or both the exposed surfaces 2a, 4a downstream of the shaping step Z, as schematically illustrated in FIG. 2. Moreover, the solution cannot be ruled out which provides for the carrying out of the application step of the decorative coating 9 after the realization of the semi-finished product 7.

Usefully, the method comprises a beading step B of at least one portion of the perimeter edge 13 adapted to cover the portion itself with a coating edge 11.

The beading step B envisages the gluing of coating strips to the sides of the perimeter edge 13 in order to create a coating edge 11.

Furthermore, the method comprises a coating step R of at least one portion of the perimeter edge 13 which is adapted to cover the perimeter edge 13 with a beading portion 10 of the coating 9.

In particular, the coating step R is carried out by means of post-forming machines, able to perform the known post-forming technique.

The post-forming machines are adapted to process the portion of the perimeter edge 13 and the coating 9 to obtain a beading portion 10 of the coating itself.

The beading portion 10 obtained with post-forming is bent and glued to the perimeter edge 13, thus covering it.

As an alternative to post-forming, the coating step R can be carried out by means of press rollers which are adapted to wrap and press a coating edge on the portion of the perimeter edge 13 to be coated.

In the event of the perimeter of the component defining a rectangular perimeter edge 13, the beading step B is performed on the short sides of the rectangle, while the coating step R (post-forming or beading) is performed on the long sides.

Cases cannot be ruled out wherein the coating step R is not envisaged, but only the beading step B is envisaged for the entire perimeter edge 13.

Advantageously, the method according to the invention permits eliminating the aforesaid risks for the health of the operators from the work environment.

Moreover, this method, because it does not require heating during the shaping step, makes it possible to produce longer molds than traditional ones or multiple in height in the event of the press being used having more than one compartment.

Where the technical characteristics mentioned in some claims are followed by reference marks, these reference marks have been included for the sole purpose of increasing understanding of the claims and, consequently, such reference marks have no restrictive effect on the interpretation of each element identified by way of example by such reference marks.

The invention claimed is:

1. A method for production of a curved furniture component, the method comprising:
    obtaining a first panel comprising a wooden material, a plastic material, a metal material, or combinations thereof, the first panel having a first surface of the first panel, a second surface of the first panel disposed opposite to the first surface of the first panel, and a perimeter of the first panel;
    obtaining a second panel comprising the wooden material, the plastic material, the metal material, or combinations thereof, the second panel having a first surface of the second panel, a second surface of the second panel, which is disposed opposite to the first surface of the second panel, and a perimeter of the second panel;
    obtaining an intermediate separating layer having a first surface of the intermediate separating layer, a second surface of the intermediate separating layer, which is disposed opposite to the first surface of the intermediate separating layer, and a perimeter of the intermediate separating layer;
    aligning the perimeter of the first panel and the perimeter of the second panel with the perimeter of the intermediate separating layer, the intermediate separating layer being disposed between the first panel and the second panel such that there is a first gap between the first panel and the intermediate separating layer and a second gap between the second panel and the intermediate separating layer;
    applying a first layer of a polyurethane type adhesive in the first gap and between the first panel and the intermediate separating layer by hot dispensing the first layer of the polyurethane type adhesive on at least one of the second surface of the first panel and the first surface of the intermediate separating layer;
    applying a second layer of the polyurethane type adhesive in the second gap and between the second panel and the intermediate separating layer by hot dispensing the second layer of the polyurethane type adhesive on at least one of the second surface of the second panel and the second surface of the intermediate separating layer;
    simultaneously with the applying of the first layer of the polyurethane type adhesive and with the applying of the second layer of the polyurethane type adhesive, spraying a water-based auxiliary substance between the first panel and the intermediate separating layer and between the second panel and the intermediate separating layer, such that the water-based auxiliary substance interacts with the polyurethane type adhesive, speeding up a rate at which the polyurethane type adhesive sets; and
    after the spraying of the water-based auxiliary substance, cold pressing the first panel, the intermediate separating layer, and the second panel together to cause the first panel, the second panel, and the intermediate separating layer to change from a substantially flat configuration to a curved configuration, and to cause the first panel and the second panel to each adhere to the intermediate separating layer, forming a unified curved furniture component.

2. The method of claim 1, wherein the cold pressing of the first panel, the intermediate separating layer, and the second panel together comprises compressing the first panel, the intermediate separating layer, and the second panel together for a time period of between 1 and 7 minutes and with a pressure of between 1 Kg/cm$^2$ and 6 Kg/cm$^2$.

3. The method of claim 1, wherein the method further comprises applying a decorative coating onto an exposed surface of the unified curved furniture component.

4. The method of claim 3, wherein the method further comprises bending a beading portion of the decorative coating and coupling the beading portion to a perimeter edge of the curved furniture component.

5. The method of claim 3, wherein the method further comprises coupling a coating strip to a perimeter edge of the curved furniture component.

6. The method of claim 1, wherein said intermediate separating layer comprises a first sheet of material and a second sheet of material arranged substantially parallel to each other, and between which is positioned an intermediate sheet made of a honeycomb material, a foam-polymer material, or combinations thereof, the first sheet having a first sheet thickness, the second sheet having a second sheet thickness, and the intermediate sheet having an intermediate sheet thickness, wherein the first sheet thickness, the second sheet thickness, and the intermediate sheet thickness are substantially the same.

7. The method of claim 1, the method further comprising:
    covering an arched portion of a perimeter edge of the unified furniture component with a coating edge that is shaped to correspond with a shape of the arched portion of the perimeter edge of the unified furniture component, such that the coating edge is coupled to each of the first panel, the intermediate separating layer, and the second panel.

8. The method of claim 1, the method further comprising covering a first surface of the unified curved furniture component with a first decorative coating having a first curved shape that corresponds to a curvature of the first surface of the unified curved furniture component, wherein the first decorative coating comprises a beading portion that extends beyond at least a part of a perimeter edge of the unified curved furniture component;
    covering a second surface of the unified curved furniture component with a second decorative coating having a second curved shape that corresponds to a curvature of the second surface of the unified curved furniture component;
    bending the beading portion of the first decorative coating toward the second decorative coating such that the beading portion covers a portion of the perimeter of the first panel, a portion of the perimeter of the second panel, and a portion of the intermediate separating layer; and
    coupling the beading portion of the first decorative coating to an edge of the second decorative coating.

9. The method of claim 8, the method further comprising covering an arched portion of a perimeter edge of the unified furniture component with a coating edge having that is shaped to correspond with a shape of the arched portion of the perimeter edge of the unified furniture component, such that the coating edge is coupled to each of the first panel, the intermediate separating layer, the second panel, the first decorative coating, and the second decorative coating.

* * * * *